(12) United States Patent
Ishikawa et al.

(10) Patent No.: US 9,537,257 B2
(45) Date of Patent: Jan. 3, 2017

(54) IMAGE PROJECTION APPARATUS AND LIGHT SOURCE UNIT

(71) Applicants: Naoyuki Ishikawa, Kanagawa (JP); Tetsuya Fujioka, Kanagawa (JP); Hideo Kanai, Tokyo (JP); Akihisa Mikawa, Kanagawa (JP); Masamichi Yamada, Kanagawa (JP); Yasunari Mikutsu, Tokyo (JP); Satoshi Tsuchiya, Kanagawa (JP); Yukimi Nishi, Tokyo (JP)

(72) Inventors: Naoyuki Ishikawa, Kanagawa (JP); Tetsuya Fujioka, Kanagawa (JP); Hideo Kanai, Tokyo (JP); Akihisa Mikawa, Kanagawa (JP); Masamichi Yamada, Kanagawa (JP); Yasunari Mikutsu, Tokyo (JP); Satoshi Tsuchiya, Kanagawa (JP); Yukimi Nishi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 98 days.

(21) Appl. No.: 14/684,854

(22) Filed: Apr. 13, 2015

(65) Prior Publication Data
US 2015/0311632 A1    Oct. 29, 2015

(30) Foreign Application Priority Data
Apr. 25, 2014  (JP) ................. 2014-092067

(51) Int. Cl.
*H01R 13/631* (2006.01)
*G03B 21/20* (2006.01)
(Continued)

(52) U.S. Cl.
CPC ........... *H01R 13/631* (2013.01); *G03B 21/145* (2013.01); *G03B 21/2093* (2013.01); *H04N 9/3141* (2013.01)

(58) Field of Classification Search
CPC .. G03B 21/145; G03B 21/2093; H04N 9/3141
See application file for complete search history.

(56) References Cited

U.S. PATENT DOCUMENTS

| 6,390,627 B1 * | 5/2002 | Kuroda ................. F16M 11/10 248/133 |
| 6,416,184 B1 * | 7/2002 | Arai ..................... G03B 21/145 349/5 |

(Continued)

FOREIGN PATENT DOCUMENTS

| CN | 1196587 A | 10/1998 |
| CN | 1376323 A | 10/2002 |

(Continued)

OTHER PUBLICATIONS

Combined Chinese Office Action and Search Report issued Jun. 3, 2016 in Patent Application No. 201510169071.9 (with English Translation of Categories of Cited Documents).

(Continued)

*Primary Examiner* — Sultan Chowdhury
(74) *Attorney, Agent, or Firm* — Oblon, McClelland, Maier & Neustadt, L.L.P.

(57) ABSTRACT

An image projection apparatus includes a casing, a light source unit detachably mounted to the casing, a first connector having a first engagement member, disposed on a housing of the light source unit, a second connector having a second engagement member, disposed on the casing, and one or more supporters disposed at least one of the first connector and the second connector. The first connector is detachably engageable with the second connector. At least one of the first connector and the second connector is moveable in a direction substantially perpendicular to a connection direction of the first connector and the second connector. The one or more supporters guides one of the first engagement member and the second engagement member to the other one of the first engagement member and the second engagement member when engaging the first connector and the second connector.

9 Claims, 11 Drawing Sheets

(51) Int. Cl.
*G03B 21/14* (2006.01)
*H04N 9/31* (2006.01)

(56) References Cited

U.S. PATENT DOCUMENTS

| | | |
|---|---|---|
| 6,508,556 B1 | 1/2003 | Ueda |
| 2005/0024604 A1 | 2/2005 | Ho et al. |
| 2006/0079113 A1 | 4/2006 | Minich |
| 2010/0117539 A1 | 5/2010 | Kotani et al. |
| 2013/0114054 A1 | 5/2013 | Ishikawa et al. |

FOREIGN PATENT DOCUMENTS

| | | |
|---|---|---|
| CN | 203277822 U | 11/2013 |
| JP | 6-140096 A | 5/1994 |
| JP | 2001-52813 A | 2/2001 |
| JP | 2001-330889 A | 11/2001 |
| JP | 2006-215149 | 8/2006 |

OTHER PUBLICATIONS

Extended European Search Report issued Nov. 16, 2015 in Patent Application No. 15163889.7.

\* cited by examiner

FIG. 8
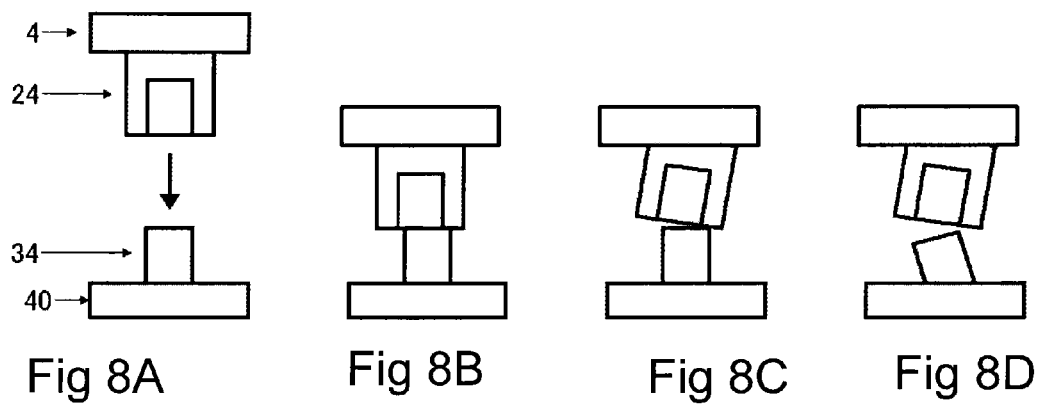
Fig 8A  Fig 8B  Fig 8C  Fig 8D
FIG. 9
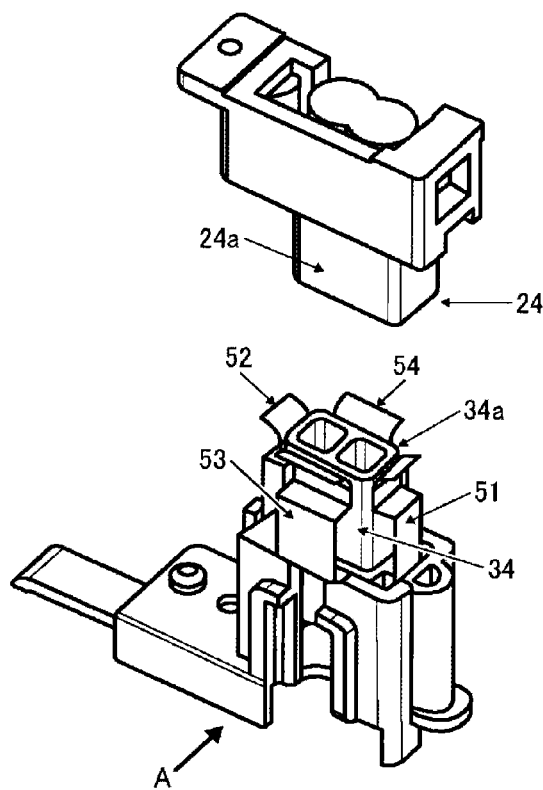

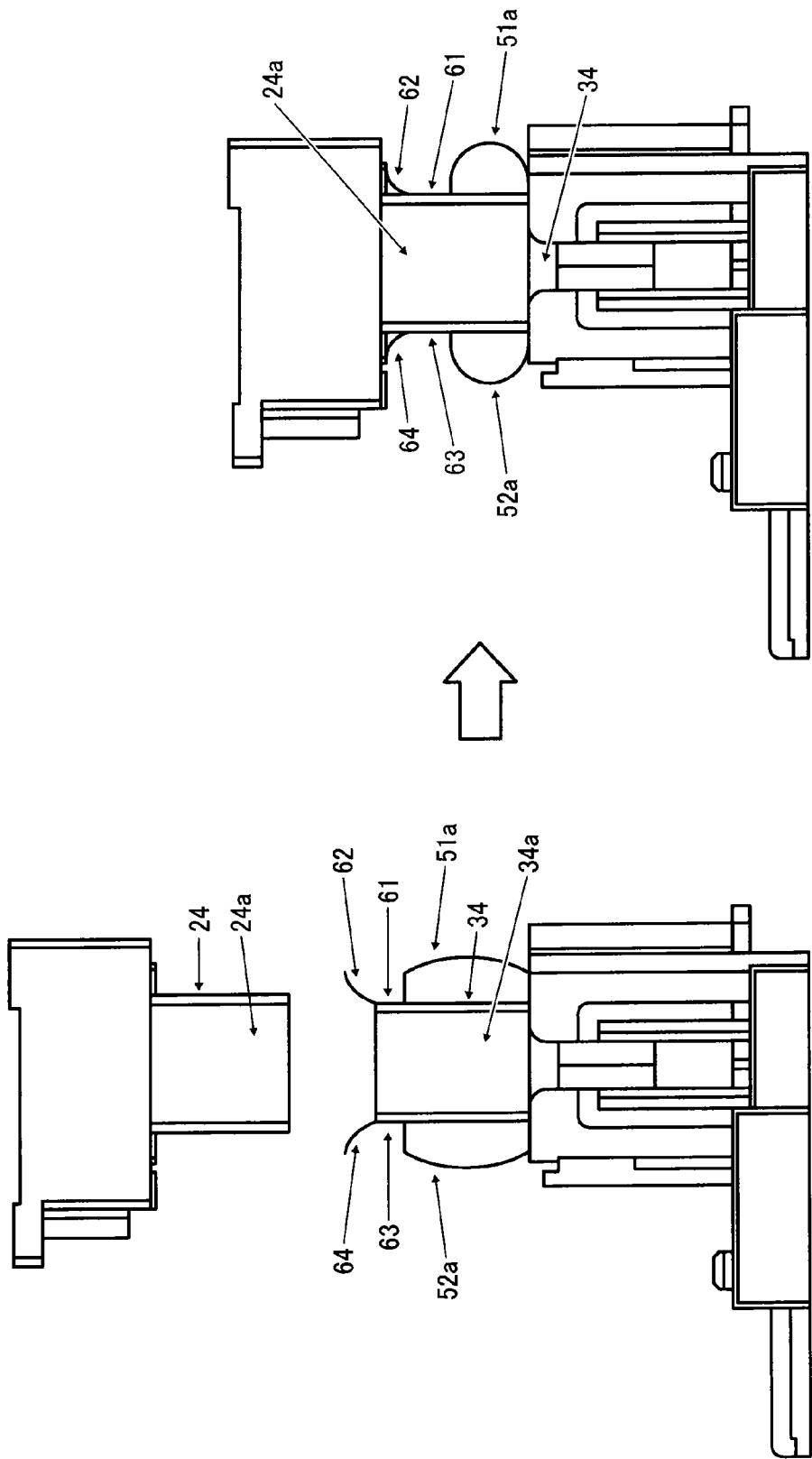

IMAGE PROJECTION APPARATUS AND LIGHT SOURCE UNIT

CROSS-REFERENCE TO RELATED APPLICATION

This application claims priority pursuant to 35 U.S.C. §119(a) to Japanese Patent Application No. 2014-092067, filed on Apr. 25, 2014 in the Japan Patent Office, the disclosure of which are incorporated by reference herein in their entirety.

BACKGROUND

Technical Field

The present invention relates to an image projection apparatus and a light source unit.

Background Art

Image projection apparatuses such as projectors include a light source such as a lamp, and an optical engine. Since the luminance of light source deteriorates by using the light source over time, a replacement work of the light source unit or lamp unit is required. Since a position of the lamp unit with respect to the optical engine may change the luminance level of lamp, the lamp unit with respect to the optical engine is required to be at a position with high precision. For example, the lamp unit is fixed to the optical engine by engaging pins and holes such as three pins and three holes. Further, the lamp unit has a power-supply connector connectable to another power-supply connector for supplying power to the lamp.

The lamp unit is attached and fixed to the optical engine by engaging the pins and holes, and the power-supply connectors, in which the power-supply connectors are slideably disposed so that the power-supply connectors do not interfere the positioning of the lamp unit to the optical engine.

However, since the power-supply connectors are slideably disposed, an engagement work of the connectors becomes difficult, and thereby a replacement work of the lamp unit becomes difficult to perform. For example, in JP-2006-215149-A (JP-4940555-B), a lamp connector slideable in a direction perpendicular to a replacement direction is connected to another connector in an image projection apparatus. In this configuration, an engagement work of the connectors becomes difficult.

SUMMARY

In one aspect of the present invention, an image projection apparatus is devised. The image projection apparatus includes a casing, a light source unit detachably mountable to the casing, a first connector having a first engagement member disposed on a housing of the light source unit, the first connector disposed at one end of a power supply line of the light source unit, a second connector having a second engagement member disposed on the casing, the second connector disposed at one end of a power supply line in the image projection apparatus, the first connector detachably engageable with the second connector, at least one of the first connector and the second connector moveable in a direction substantially perpendicular to a connection direction of the first connector and the second connector, and one or more supporters disposed at least one of the first connector and the second connector to guide one of the first engagement member and the second engagement member to the other one of the first engagement member and the second engagement member when engaging the first connector and the second connector. Each of the supporters retains a posture of one of the first connector and the second connector disposed with the supporters when the first connector and the second connector are separated.

In another aspect of the present invention, a light source unit detachably mounted to a casing of an image projection apparatus is devised. The light source unit includes a first connector disposed on a housing of the light source unit, the first connector disposed at one end of a power supply line in the light source unit, the first connector having a first engagement member detachably engageable with a second engagement member of a second connector disposed on a casing of the image projection apparatus, the second connector disposed at one end of a power supply line in the image projection apparatus, at least one of the first connector and the second connector moveable in a direction substantially perpendicular to a connection direction of the first connector and the second connector, and one or more supporters disposed at the first connector to guide the second engagement member to the first engagement member when engaging the first connector and the second connector. Each of the supporters retains a posture of the first connector when the first connector and the second connector are separated.

In another aspect of the present invention, an image projection apparatus is devised. The image projection apparatus includes a casing, a light source unit detachably mounted to the casing, a first connector having a first engagement member disposed on a housing of the light source unit, the first connector disposed at one end of a power supply line of the light source unit, a second connector having a second engagement member disposed on the casing, the second connector disposed at one end of a power supply line in the image projection apparatus, the first connector detachably engageable with the second connector, at least one of the first connector and the second connector moveable in a direction substantially perpendicular to a connection direction of the first connector and the second connector, and one or more supporters disposed at the second connector to guide the first engagement member to the second engagement member when engaging the first connector and the second connector. Each of the supporters retains a posture of the second connector when the first connector and the second connector are separated.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 8A, 8B, 8C, and 8D are schematic views of engagement of an input terminal and an output terminal;

FIG. 9 is a perspective view of an engagement member of the input terminal, and an engagement member of the output terminal according to an example embodiment;

FIG. 14 illustrates a configuration for engaging an input terminal and an output terminal according to a second example embodiment.

Figure 1:
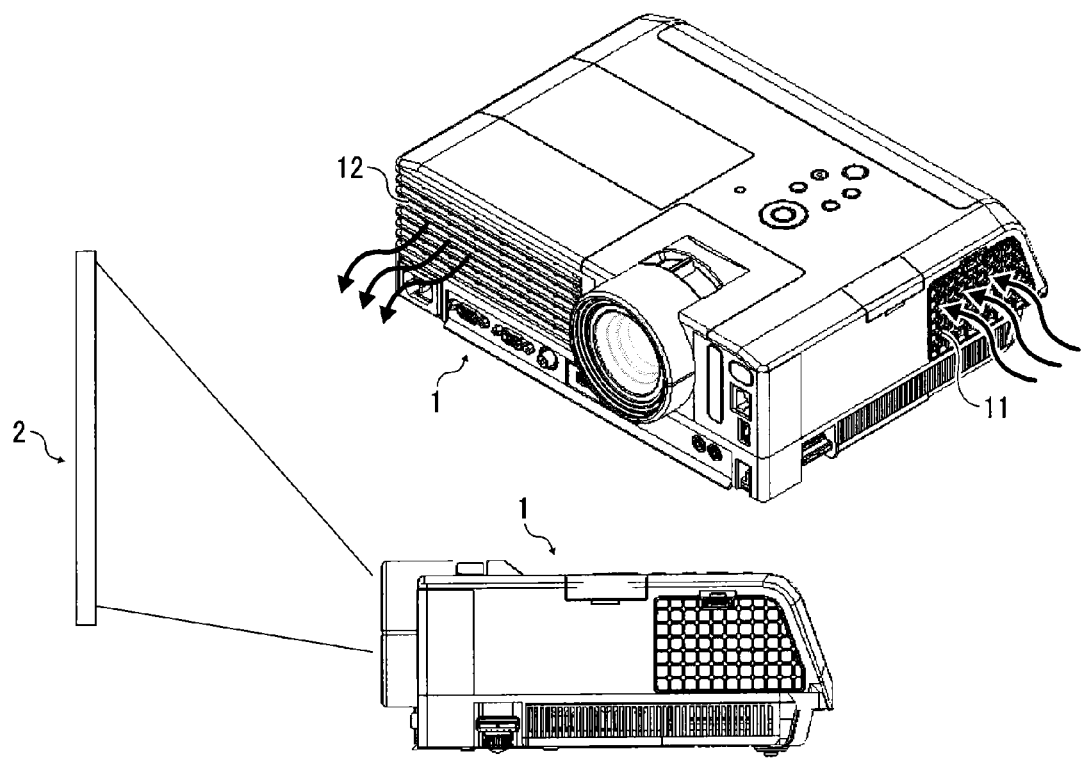
FIG. 1 is a perspective view of an image projection apparatus according to an example embodiment, and a side view of the image projection apparatus 1 that can project an image onto a screen.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, apparatus or system according to one or more example embodiments are described hereinafter.

(First Example Embodiment)

A description is given of an image projection apparatus 1 according to a first example embodiment with reference to drawings. FIG. 1 is a perspective view of the image projection apparatus 1, and a side view of the image projection apparatus 1 that can project an image onto a screen 2.

The image projection apparatus 1 generates images based on image data input from other apparatuses such as a personal computer (PC) and video camera, and projects the generated images on the screen 2 or the like. The image projection apparatus 1 is available as liquid crystal projectors, which have been enhancing resolution of liquid crystal panel, enhancing luminance of light source by improving efficiency, and lowering market prices. Further, the image projection apparatus 1 is available as light-weight compact projectors employing a digital micro-mirror device (DMD). These projectors are used at offices, schools, homes, and others. For example, front type projectors, which enhance portability, are used for small meetings.

These projectors are demanded to project a larger image (i.e., larger image on a projection face) while reducing a projection space required outside the projectors.

With the enhanced performance of an optical engine, projectors that can project an image with a size of 60-80 inch with a projection distance of 1-2 m have been developed and available. Compared to conventional projectors having a longer projection distance and thereby placed at a rear side of a meeting table, projectors having a shorter projection distance can be placed at a front side of a meeting table, with which a space at a rear side of the projectors can be used freely.

Since the image projection apparatus 1 includes a light source, and many electronic boards, internal temperature of the image projection apparatus 1 increases during the activation. The image projection apparatus 1 has an air intake port 11, and an exhaust port 12 as illustrated in FIG. 1 to cool internal parts using an air flow so that temperature of the internal parts can be maintained at heat-resistance temperature.

Figure 2:
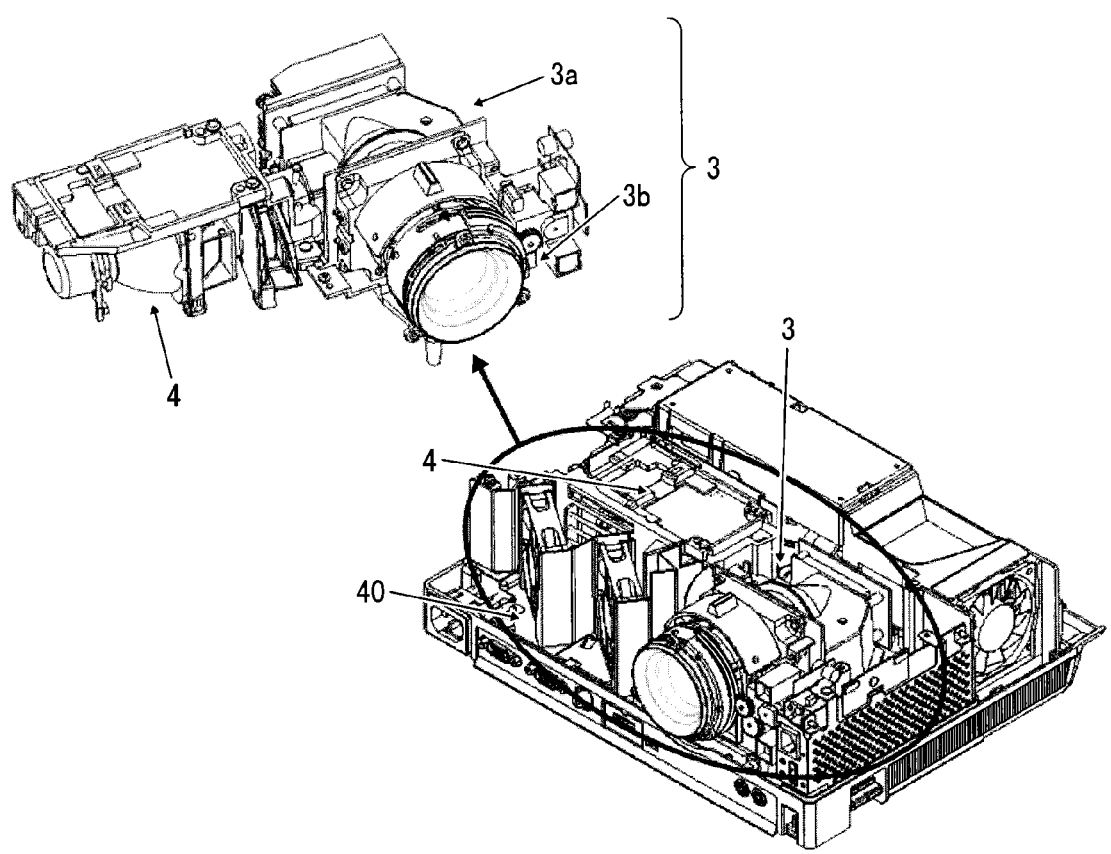
FIG. 2 is an internal configuration and arrangement an optical engine and a light source unit of the image projection apparatus 1 when an outer cover is removed.
Figure 3:
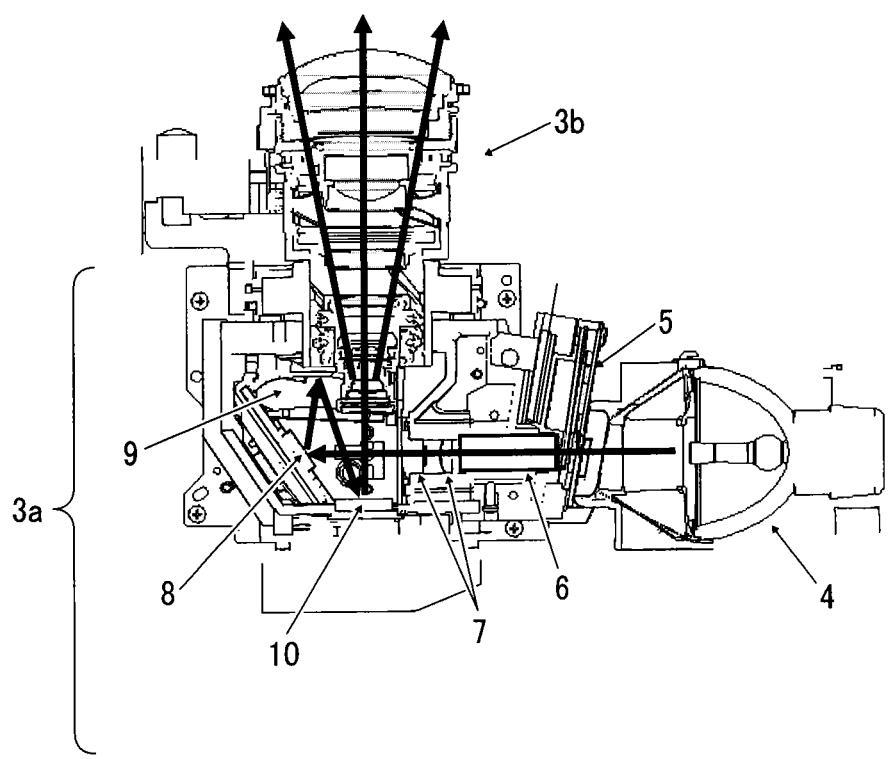
FIG. 3 is a cross-sectional view of a lighting unit and a projection unit of the optical engine shown in FIG. 2.

FIG. 2 is an internal configuration and arrangement of the image projection apparatus 1 when an outer cover of the image projection apparatus 1 is removed. As illustrated in FIG. 2, the image projection apparatus 1 includes, for example, an optical engine 3, and a light source unit 4 such as a lamp unit. The optical engine 3 includes, for example, a lighting unit 3a, and a projection unit 3b. The light source unit 4 employs, for example, a high pressure mercury lamp. Light emitted from the light source unit 4 irradiates the lighting unit 3a of the optical engine 3. The irradiated white light is divided into red, green, and blue (RGB) light in the lighting unit 3a, and then guided to an image display element 10 (FIG. 3). The image display element 10 generates an image based on modulation signals, and the projection unit 3b projects the image by increasing the image size.

FIG. 3 is a cross-sectional view of the lighting unit 3a and the projection unit 3b of the optical engine 3. As illustrated in FIG. 3, the optical engine 3 includes, for example, a color wheel 5, a light tunnel 6, a relay lens 7, a flat mirror 8, a concave mirror 9, and an image display element 10. The color wheel 5 is a disk that rotates in one direction to convert the white light coming from the light source unit 4 into each of RGB light time divisionally, and outputs the RGB light. The light tunnel 6 composed of glass plates, shaped in a tube, guides the light output from the color wheel 5. The relay lens 7 includes two lenses to correct chrominance difference or chromatic aberration on the axis of light output from the light tunnel 6, and focuses the light. The flat mirror 8 and the concave mirror 9 reflect and focus the light output from the relay lens 7 to the image display element 10. The image display element 10 is, for example, a DMD that has a rectangular micro face composed of a plurality of micro mirrors. As to the DMD, each of the micro mirrors is driven time divisionally based on image data to reflect light for generating an image, and the reflected light is used as a projection light.

A part of light reflected by the plurality of the micro mirrors, which is controlled based on the image data that are processed time divisionally, is directed to a plurality of projection lenses as image light, and other light is directed to an OFF plate as non-effective light. The image light generated by the image display element 10 is reflected and directed to the projection unit 3b, and then the image light passing the plurality of projection lenses is projected onto the screen 2.

Figure 4:
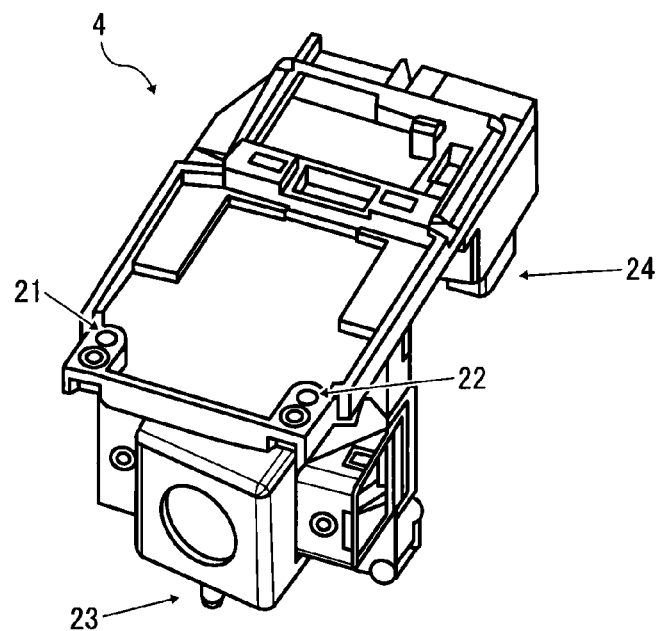
FIG. 4 is a perspective view of the light source unit shown in FIG. 2.

FIG. 4 is a perspective view of the light source unit 4. The light source unit 4 has holes 21 and 22, and a pin 23 used for connecting or engaging the light source unit 4 with the optical engine 3. Further, the light source unit 4 has an input terminal 24 used for receiving power supply to the light source unit 4. The input terminal 24 is disposed at one end of a cable or cord disposed for the light source unit 4 to supply power supply to the light source unit 4, wherein the cable or cord is used as a power supply line to supply power to a light source of the light source unit 4. The input terminal 24 is also referred to a first connector. Since luminance of the light source unit 4 decreases by using the light source unit 4 over time, the light source unit 4 is required to be replaced when the light source unit 4 is used for a given time period.

Figure 5:
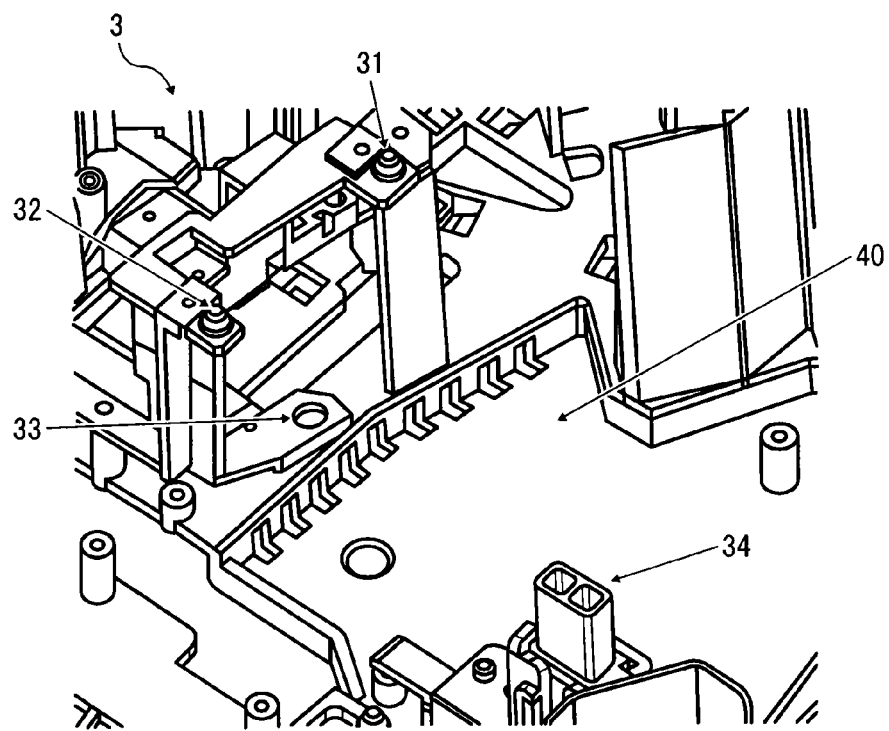
FIG. 5 is a perspective view of engagement members of the optical engine used for engaging with the light source unit.

FIG. 5 is a perspective view of engagement members of the optical engine 3 used for connecting or engaging the optical engine 3 with the light source unit 4. The optical engine 3 has pins 31 and 32, a hole 33 used for connecting with the light source unit 4. Further, the optical engine 3 has an output terminal 34, used for outputting power supply to the light source unit 4, on a base 40, which may be a part of a casing of the image projection apparatus 1. The output terminal 34 is disposed at one end of a cable or cord disposed in the image projection apparatus 1 to supply power supply to the light source unit 4, wherein the cable or cord is used as a power supply line to supply power to the light source unit 4. The output terminal 34 is also referred to a second connector. In this specification, the input terminal 24 and the output terminal 34 can be used as the connectors for power supply to the light source unit 4.

Figure 6:
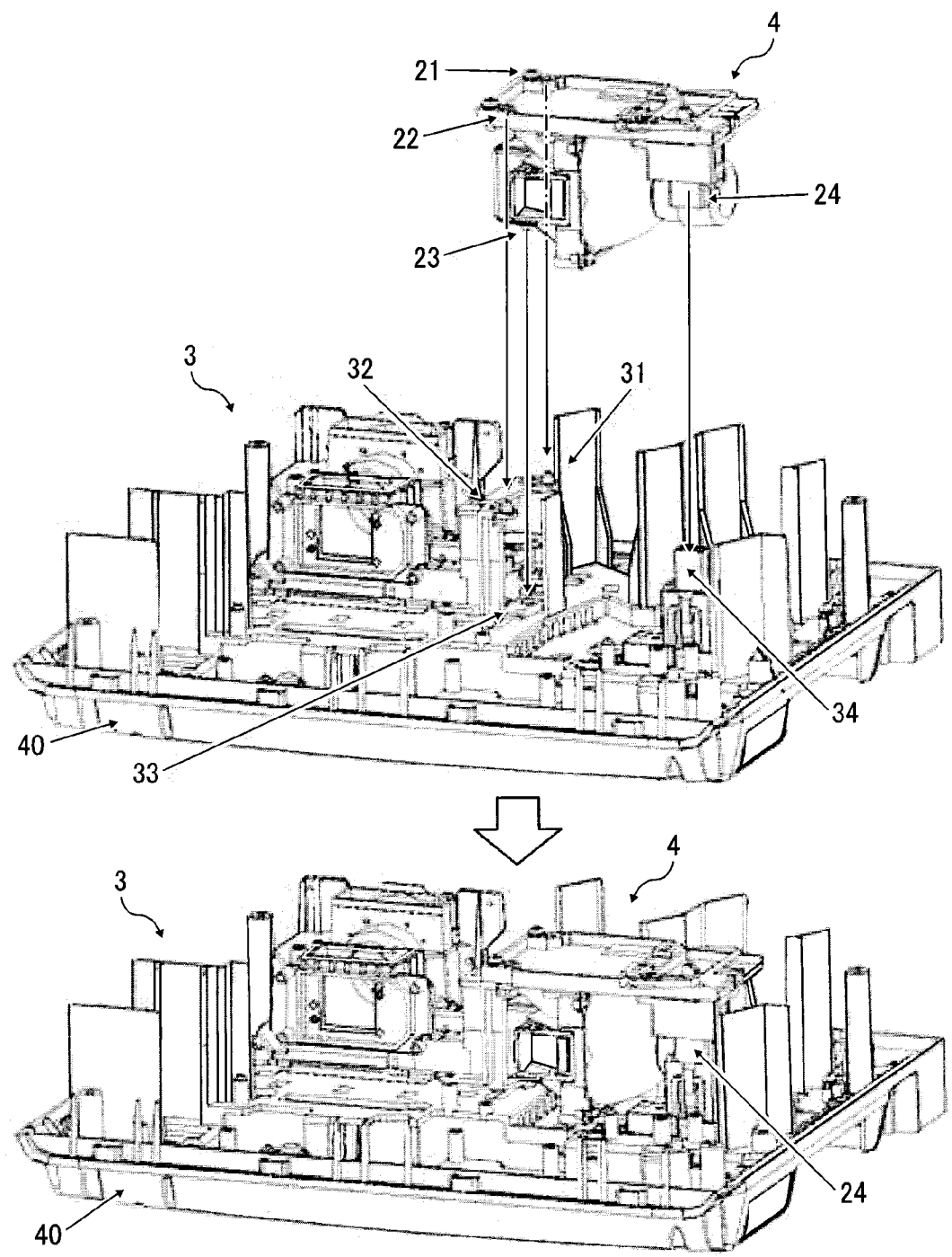
FIG. 6 illustrates a connection process of the light source unit and the optical engine by using engagement members.

FIG. 6 illustrates a connection process of the light source unit 4 and the optical engine 3, in which the hole 21 of the light source unit 4 engages the pin 31 of the optical engine 3, the hole 22 of the light source unit 4 engages the pin 32 of the optical engine 3, and the pin 23 of the light source unit 4 engages the hole 33 of the optical engine 3 to connect the light source unit 4 and the optical engine 3. By engaging these three pins and three holes, a positional relationship of the optical engine 3 and the light source unit 4 can be set desirably.

Further, the input terminal 24 of the light source unit 4 engages the output terminal 34 of the optical engine 3, used for power supply to the light source unit 4 when connecting the light source unit 4 and the optical engine 3. Since the light source unit 4 is set at a given position by the above described engagement of the three pins and three holes, engagement members of the input terminal 24 and the output terminal 34 are configured to be moveable such as slideable in the horizontal direction.

Figure 7:
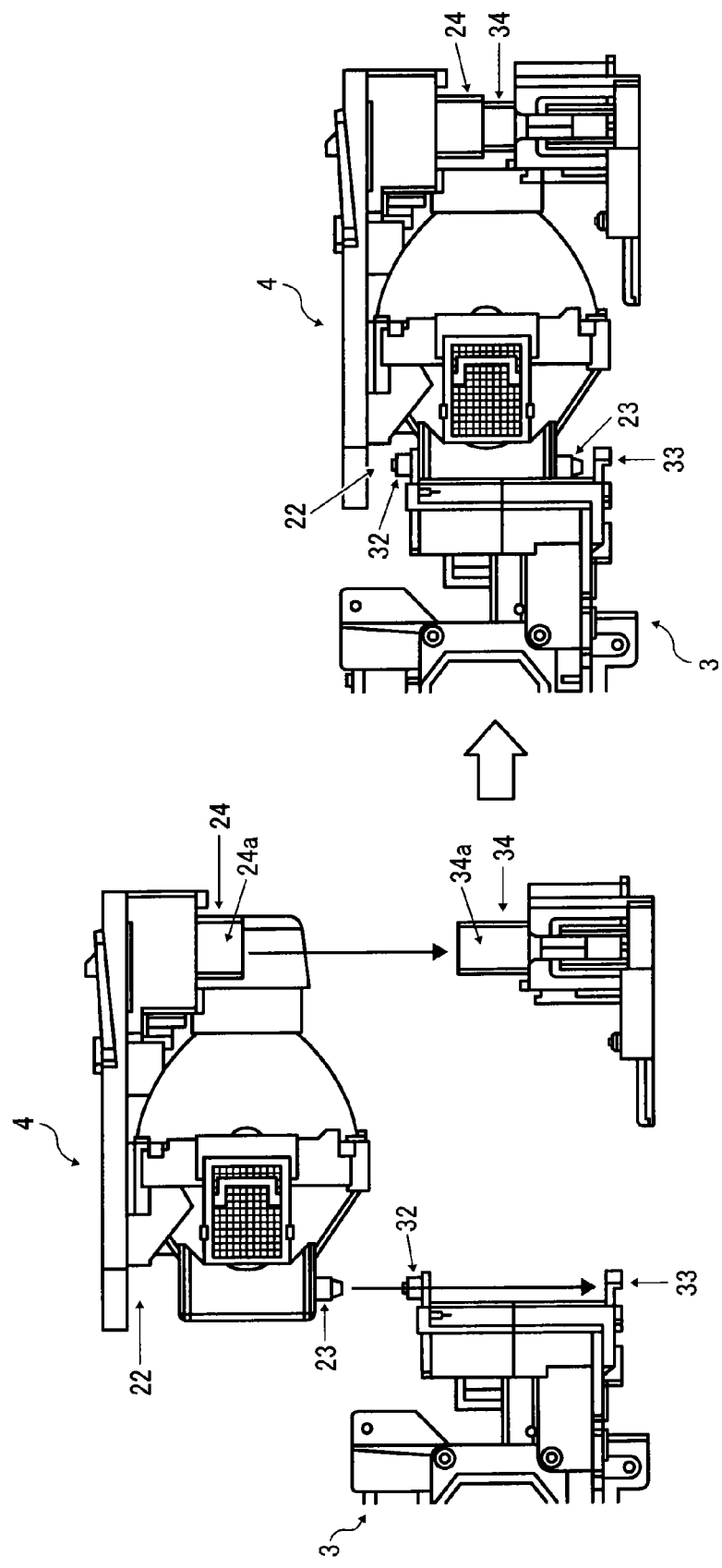
FIG. 7 is a side view of engagement members of the light source unit and the optical engine viewed from the horizontal direction.

FIG. 7 is a side view of the engagement members of the light source unit 4, and the optical engine 3 viewed from the horizontal direction. Specifically, the input terminal 24 includes an engagement member 24a, and the output terminal 34 includes an engagement member 34a, and the input terminal 24 and the output terminal 34 engages with each other by engaging the engagement member 24a and the engagement member 34a as illustrated in FIG. 7. When connecting the light source unit 4 and the optical engine 3, the input terminal 24 and the output terminal 34 engages before the pins 31, 32 and 23 engage the holes 21, 22, and 33, respectively. Since the input terminal 24 and the output terminal 34 are moveable such as slideable in the horizontal direction after engaging the input terminal 24 and the output terminal 34, the engaged input terminal 24 and the output terminal 34 do not interfere the engagement work of the pins 31, 32 and 23 to the holes 21, 22, and 33. However, since the input terminal 24 and the output terminal 34 are moveable as illustrated in FIGS. 8B, 8C, and 8D, the engagement members 24a and 34a of the input terminal 24 and the output terminal 34 may not be aligned exactly at a desired engagement position when the engagement work is to be conducted, and thereby the engagement work of the input terminal 24 and the output terminal 34 becomes difficult.

FIG. 8 is a schematic view of engagement of the input terminal 24 and the output terminal 34. As illustrated in FIG. 8A, the input terminal 24 is moved to the output terminal 34 along a direction indicated by an arrow to engage the input terminal 24 and the output terminal 34. Since the input terminal 24 and the output terminal 34 are moveable such as slideable and inclinable in the horizontal direction as illustrated in FIG. 8B to 8D, it is difficult to align the engagement members 24a and 34a of the input terminal 24 and the output terminal 34. For example, as illustrated in FIG. 8B, the input terminal 24 and/or the output terminal 34 slide in the horizontal direction, with which the engagement members 24a and 34a may not be aligned exactly when the engagement work is performed, and thereby the engagement of the input terminal 24 and the output terminal 34 becomes difficult. Further, as illustrated in FIG. 8C and 8D, the input terminal 24 and/or the output terminal 34 incline, with which the engagement members 24a and 34a of the input terminal 24 and the output terminal 34 may not be aligned exactly when the engagement work is performed, and thereby the engagement of the input terminal 24 and the output terminal 34 becomes difficult.

FIG. 9 is a perspective view of the engagement member 24a of the input terminal 24, and the engagement member 34a of the output terminal 34 according to an example embodiment. As illustrated in FIG. 9, leaf springs 51 to 54 are disposed, for example, at four sides of the output terminal 34, and each of the leaf springs 51 to 54 can be fixed at a portion where the output terminal 34 is fixed. The leaf spring may be also referred to a plate spring, laminated spring, or flat spring.

Figure 10:
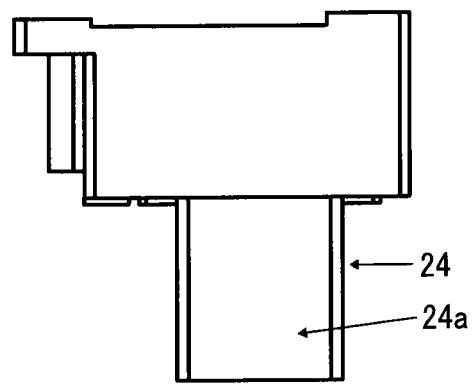
FIG. 10 is a side view of the engagement member of the input terminal and the engagement member of the output terminal viewed from a direction of "A" in FIG. 9.
Figure 10:
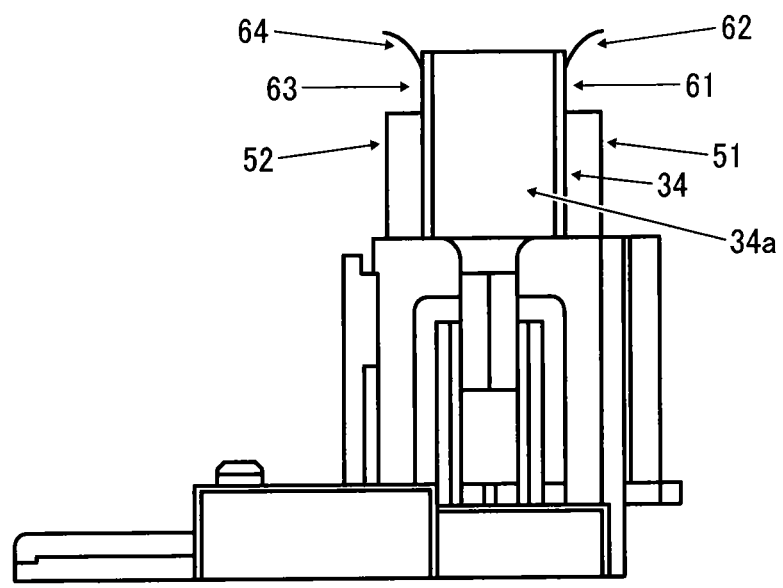

FIG. 10 is a side view of the engagement member 24a of the input terminal 24 and the engagement member 34a of the output terminal 34 viewed from a direction of "A" in FIG. 9, in which the leaf springs 53 and 54 are omitted from the drawing. Since the leaf springs 51 and 52 are disposed to contact the output terminal 34 at contact portions 61 and 63, respectively, the inclining of the output terminal 34 can be prevented, which means each of the leaf springs 51 and 52 can be used as a supporter that maintains or supports a posture of the output terminal 34, which means that the supporter can be used to regulate a moveable range of the connector in a direction in a direction perpendicular to a connection direction of the connectors (e.g., terminals) to maintain or retain a posture of at least one of the connectors.

Further, guides 62 and 64 are disposed at one end of the leaf springs 51 and 52, respectively. By using the guides 62 and 64, the engagement member 24a of the input terminal 24 can be guided to the engagement member 34a of the output terminal 34. Each of the leaf springs 51 and 52 is an elastic body or elastic member made of elastic material such as resin, stainless steel (SUS), or the like.

Figure 11:
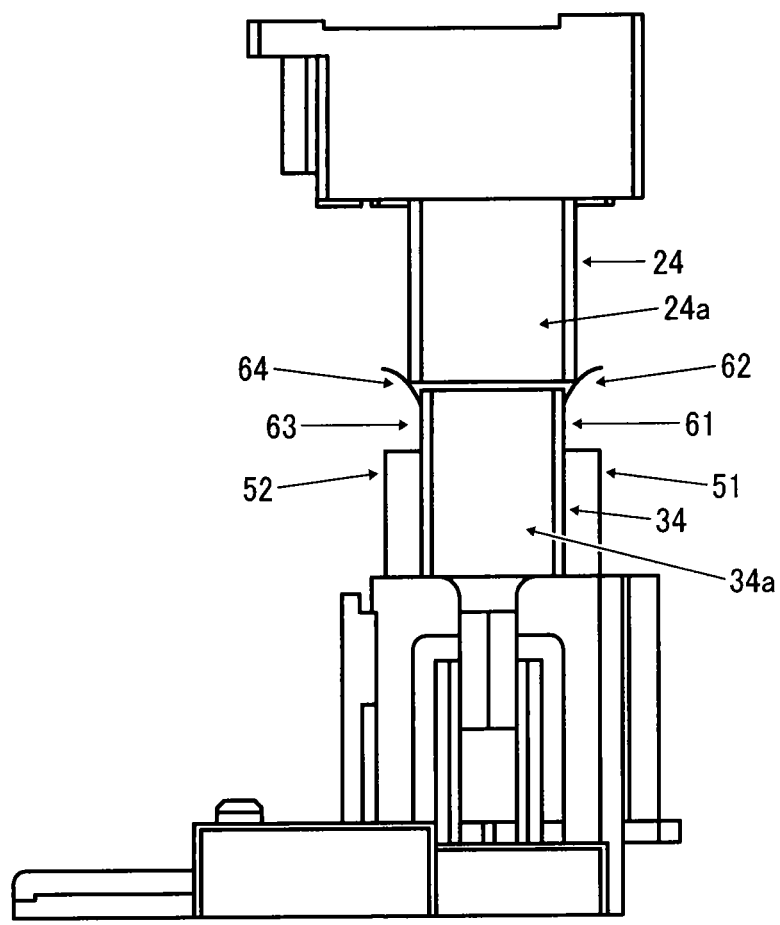
FIG. 11 illustrates a configuration just before engaging the input terminal and the output terminal of FIG. 9.
Figure 12:
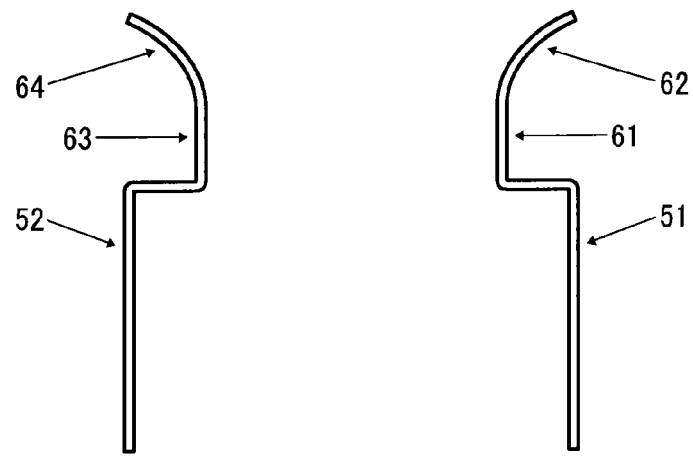
FIG. 12 is an expanded view of leaf springs illustrated in FIG. 11.
Figure 13:
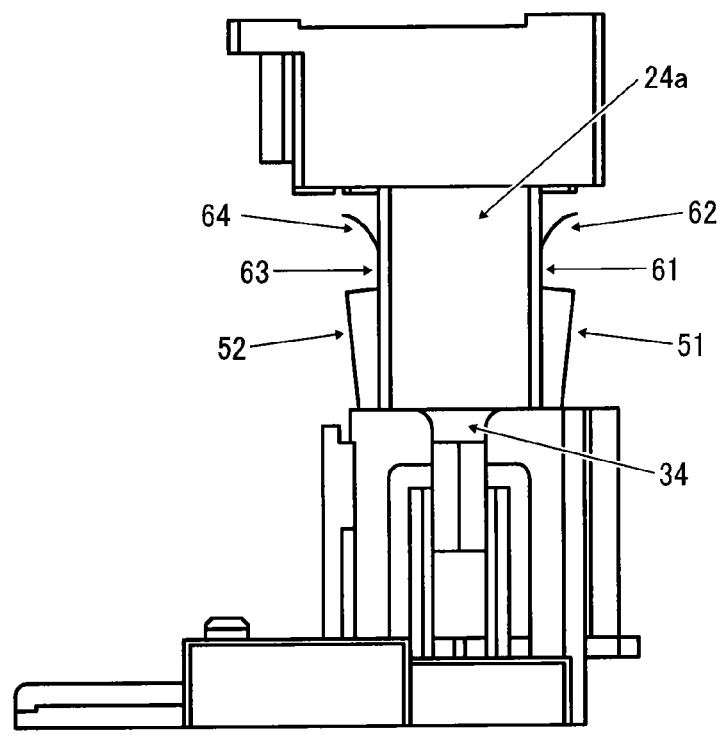
FIG. 13 is a configuration after engaging the input terminal and the output terminal of FIG. 9.

FIG. 11 illustrates a configuration just before engaging the input terminal 24 and the output terminal 34, in which the engagement member 24a of the input terminal 24 can be guided to the engagement member 34a of the output terminal 34 by using the guides 62 and 64. FIG. 12 is an expanded view of the leaf springs 51 and 52 illustrated in FIG. 11. FIG. 13 is a configuration after engaging the input terminal 24 and the output terminal 34. After the engagement of the input terminal 24 and the output terminal 34, each of the leaf springs 51 and 52 deforms in the horizontal direction, which is substantially perpendicular to the connection direction or engagement direction of the input terminal 24 and the output terminal 34. Therefore, the leaf springs 51 and 52 do not interfere the engagement of the input terminal 24 and the output terminal 34.

(Second Example Embodiment)

FIG. 14 illustrates a configuration for engaging the input terminal 24 and the output terminal 34 according to a second example embodiment, in which leaf springs 51 a and 52a having a warped or curved shape are used. In this configuration, each of the leaf springs 51a and 52a can deform along the connection direction or engagement direction of the input terminal 24 and the output terminal 34 (e.g., upper-lower direction in FIG. 14), and further in the horizontal direction, which is substantially perpendicular to the connection direction or engagement direction. Therefore, even if a length of the input terminal 24 and the output terminal 34 in the connection direction or engagement direction is short, each of the leaf springs 51 a and 52a has a shape that does not interfere the engagement of the input terminal 24 and the output terminal 34.

Further, as to the above described first and second example embodiments, the supporter (e.g., leaf spring) having the guide is disposed for the connector of the optical engine, which may be a part of a casing of the image projection apparatus, but the supporter having the guide can be disposed at the connector of the light source unit such as a lamp unit. Further, the supporter having the guide can be disposed at both of the optical engine and the light source unit.

(Effect of Example Embodiments)

As to the above described first and second example embodiments, the connectors used for power-supply to the light source unit are disposed moveably in a given moveable range so that the connectors do not interfere the positioning of the light source unit and the optical engine, and the guide is disposed at an end of at least one of the connectors to guide one engagement member to another engagement member at a desired position when engaging the connectors, and the supporter can be used to regulate the moveable range of the connector.

By disposing the guide at an end of at least one of the connectors used for power-supply to the light source unit, the inclining of the connector can be prevented, and one engagement member disposed at an end of one connector can be guided to a desired engagement position with another engagement member disposed at an end of another connector, with which the connectors can be engaged smoothly. Therefore, the connectors can be aligned at the desired engagement position smoothly while the connectors used for power-supply to the light source unit are disposed moveably. Therefore, a replacement work of the light source unit such a lamp unit can be performed with enhanced efficiency.

Numerous additional modifications and variations for the communication terminal, information processing system, and information processing method, a program to execute the information processing method by a computer, and a storage or carrier medium of the program are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An image projection apparatus, comprising: a casing; a light source unit detachably mountable to the casing; a first connector having a first engagement member disposed on a housing of the light source unit, the first connector disposed at one end of a power supply line of the light source unit; a second connector having a second engagement member disposed on the casing, the second connector disposed at one end of a power supply line in the image projection apparatus, the first connector detachably engageable with the second connector, at least one of the first connector and the second connector moveable in a direction substantially perpendicular to a connection direction of the first connector and the second connector; and one or more supporters disposed at least one of the first connector and the second connector to guide one of the first engagement member and the second engagement member to the other one of the first engagement member and the second engagement member when engaging the first connector and the second connector, wherein each of the supporters retains a posture of one of the first connector and the second connector disposed with the supporters when the first connector and the second connector are separated.

2. The image projection apparatus of claim 1, wherein each of the supporters is made of elastic material.

3. The image projection apparatus of claim 1, wherein each of the supporters deforms in a direction substantially perpendicular to the connection direction of the first connector and the second connector when the first connector and the second connector are engaged.

4. The image projection apparatus of claim 1, wherein each of the supporters deforms in the connection direction of the first connector and the second connector, and in the direction substantially perpendicular to the connection direction of the first connector and the second connector when the first connector and the second connector are engaged.

5. The image projection apparatus of claim 1, wherein each of the supporters regulates a moveable range of at least one of the first connector and the second connector in a direction perpendicular to the connection direction of the first connector and the second connector to retain a posture of the at least one of the first connector and the second connector.

6. The image projection apparatus of claim 5, wherein the each of the supporters includes a guide that guides one of the first engagement member and the second engagement member to the other one of the first engagement member and the second engagement member when engaging the first connector and the second connector.

7. The image projection apparatus of claim 1, wherein the one or more supporters are disposed at the first connector alone, the one or more supporters are disposed at the second connector alone, or the one or more supporters are disposed at the first connector and the second connector.

8. A light source unit detachably mounted to a casing of an image projection apparatus, comprising: a first connector disposed on a housing of the light source unit, the first connector disposed at one end of a power supply line in the light source unit, the first connector having a first engagement member detachably engageable with a second engagement member of a second connector disposed on the casing of the image projection apparatus, the second connector disposed at one end of a power supply line in the image projection apparatus, at least one of the first connector and the second connector moveable in a direction substantially perpendicular to a connection direction of the first connector and the second connector, and one or more supporters disposed at the first connector to guide the second engagement member to the first engagement member when engaging the first connector and the second connector, wherein each of the supporters retains a posture of the first connector when the first connector and the second connector are separated.

9. An image projection apparatus, comprising:
a casing;
a light source unit detachably mounted to the casing;
a first connector having a first engagement member disposed on a housing of the light source unit, the first connector disposed at one end of a power supply line of the light source unit;
a second connector having a second engagement member disposed on the casing, the second connector disposed at one end of a power supply line in the image projection apparatus, the first connector detachably engageable with the second connector, at least one of the first connector and the second connector moveable in a direction substantially perpendicular to a connection direction of the first connector and the second connector; and
one or more supporters disposed at the second connector to guide the first engagement member to the second engagement member when engaging the first connector and the second connector, wherein each of the supporters retains a posture of the second connector when the first connector and the second connector are separated.

* * * * *